United States Patent
Hayashi et al.

(10) Patent No.: US 7,653,772 B2
(45) Date of Patent: Jan. 26, 2010

(54) CONTROL SYSTEM, ELECTRONIC DEVICE AND IMAGE FORMING APPARATUS

(75) Inventors: Motohiro Hayashi, Kyoto (JP); Kenji Ogasawara, Tondabayashi (JP); Mariko Arai, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 123 days.

(21) Appl. No.: 11/466,782

(22) Filed: Aug. 24, 2006

(65) Prior Publication Data
US 2007/0055805 A1    Mar. 8, 2007

(30) Foreign Application Priority Data
Sep. 8, 2005    (JP) .............................. 2005-261226

(51) Int. Cl.
*G06F 13/36* (2006.01)
*G06F 13/00* (2006.01)
*H05K 7/10* (2006.01)
*G06F 1/00* (2006.01)
*G06F 11/30* (2006.01)

(52) U.S. Cl. ...................... 710/306; 710/302; 710/304; 713/300; 713/310; 713/340

(58) Field of Classification Search ................ 710/306, 710/300–304; 713/340, 300, 310
See application file for complete search history.

(56) References Cited

U.S. PATENT DOCUMENTS

| | | | |
|---|---|---|---|
| 6,526,516 B1 * | 2/2003 | Ishikawa et al. | 713/340 |
| 6,541,879 B1 * | 4/2003 | Wright | 307/31 |
| 6,594,771 B1 * | 7/2003 | Koerber et al. | 713/330 |
| 7,024,567 B2 * | 4/2006 | Kim et al. | 713/300 |
| 7,058,825 B2 * | 6/2006 | Kobayashi | 713/300 |
| 7,155,622 B2 * | 12/2006 | Mancey et al. | 713/324 |
| 7,203,852 B2 * | 4/2007 | Cohen et al. | 713/320 |
| 7,281,146 B2 * | 10/2007 | Nalawadi et al. | 713/320 |

(Continued)

FOREIGN PATENT DOCUMENTS

CN    1383072    12/2002

(Continued)

OTHER PUBLICATIONS

Vahdat et al., "Every Joule is Precious: The Case for Revisiting Operating System Design for Energy Efficiency", Sep. 2000, ACM, Proceedings of the 9th Workshop on ACM SIGOPS European Workshop: Beyond the PC: New Challenges for the Operating System, pp. 31-36.*

(Continued)

*Primary Examiner*—Mark Rinehart
*Assistant Examiner*—Faisal M Zaman
(74) *Attorney, Agent, or Firm*—Renner, Otto, Boisselle & Sklar, LLP

(57) ABSTRACT

A control system comprising an electronic device equipped with a port, a hub being connectable to multiple external devices and to be connected to the port of the electronic device, and one or more external devices to be connected to the hub, the operation of the external devices connected via the hub being controlled using the electronic device, wherein the electronic device comprises a supplying section for supplying currents to the hub connected to the port and the external devices connected via the hub, and a storage section for storing the magnitude of the total current supplied from the supplying section.

17 Claims, 13 Drawing Sheets

U.S. PATENT DOCUMENTS

| | | | |
|---|---|---|---|
| 7,290,171 B2 * | 10/2007 | Saotome | 714/22 |
| 7,437,576 B2 * | 10/2008 | Makiyama et al. | 713/300 |
| 2002/0049920 A1 * | 4/2002 | Staiger | 713/340 |
| 2002/0162036 A1 | 10/2002 | Kim et al. | |
| 2004/0078498 A1 | 4/2004 | Saotome | |
| 2005/0033996 A1 * | 2/2005 | Fong et al. | 713/300 |
| 2005/0144495 A1 * | 6/2005 | Nakajima et al. | 713/340 |
| 2006/0117195 A1 * | 6/2006 | Niwa et al. | 713/300 |
| 2007/0029975 A1 * | 2/2007 | Martin et al. | 320/134 |

FOREIGN PATENT DOCUMENTS

| | | | |
|---|---|---|---|
| JP | 06-167969 | | 6/1994 |
| JP | 11-143446 | | 5/1999 |
| JP | 2001117678 A | * | 4/2001 |
| JP | 2004-086359 | | 3/2004 |
| JP | 2004-109765 | | 4/2004 |
| JP | 2004318836 A | * | 11/2004 |
| JP | 2005218216 A | * | 8/2005 |

OTHER PUBLICATIONS

Suresh et al., "Energy-Efficient Encoding Techniques for Off-Chip Data Buses", Jan. 2009, ACM, ACM Transactions on Embedded Computing Systems (TECS), vol. 8, Issue 2, pp. 1-23.*

Rong et al., "Power-Aware Scheduling and Dynamic Voltage Setting for Tasks Running on a Hard Real-Time System", Jan. 2006, IEEE Press, Proceedings of the 2006 Asia and South Pacific Design Automation Conference, pp. 473-478.*

Xu et al., "Minimizing Expected Energy Consumption in Real-Time Systems Through Dynamic Voltage Scaling", Dec. 2007, ACM, ACM Transactions on Computer Systems (TOCS), vol. 25, Issue 4, pp. 1-40.*

* cited by examiner

F I G. 3

| OFFSET | FIELD | VALUE | CONTENT |
|---|---|---|---|
| 0 | bLength | 12h | |
| 1 | bDescriptorType | 01h | TYPE OF DEVICE DESCRIPTOR |
| 2 | bcdUSB | 0200h | USB VERSION (=2.00) |
| 4 | bDeviceClass | 00h | DEVICE CLASS |
| 5 | bDeviceSubClass | FFh | DEVICE SUB CLASS |
| 6 | bDeviceProtocol | FFh | DEVICE PROTOCOL |
| 7 | bMaxPacketSize | 40h | PACKET SIZE (=64) |
| 8 | idVendor | 04DDh | VENDER ID |
| 10 | idProduct | 9000h | PRODUCT ID |
| 12 | bcdDevice | 0100h | DEVICE RELEASE NUMBER |
| 14 | iManufacturer | 01h | INDEX OF CHARACTER STRING FOR MANUFACTURER |
| 15 | iProduct | 02h | INDEX OF CHARACTER STRING FOR PRODUCT |
| 16 | iSerialNumber | 03h | INDEX OF CHARACTER STRING FOR SERIAL NUMBER |
| 17 | bNumConfiguration | 02h | THE NUMBER OF SUPPORTED CONFIGURATION (=2) |

F I G. 4

| OFFSET | FIELD | VALUE | CONTENT |
|---|---|---|---|
| 0 | bLength | 09h | |
| 1 | bDescriptorType | 02h | TYPE OF CONFIGURATION DESCRIPTOR |
| 2 | wTotalLength | 20h | TOTAL BYTES OF DESCRIPTOR DATA |
| 4 | bNumInterfaces | 01h | THE NUMBER OF INTERFACE |
| 5 | bConfigurationValue | 01h | INDEX OF CONFIGURATION (=1) |
| 6 | iConfiguration | 00h | INDEX OF CHARACTER STRING FOR PRESENT CONFIGURATION |
| 7 | bmAttributes | 80h | OPERATE WITH BUS POWER |
| 8 | MaxPower | 32h | CURRENT CONSUMPTION (=100mA) |
| 9-17 | Interface Descriptor | ** | INTERFACE DESCRIPTOR OF CONFIGURATION #1 |
| 18-24 | Endpoint Descriptor | ** | ENDPOINT DESCRIPTOR OF CONFIGURATION #1 |
| 25-31 | Endpoint Descriptor | ** | ENDPOINT DESCRIPTOR OF CONFIGURATION #1 |

F I G. 5

| OFFSET | FIELD | VALUE | CONTENT |
|---|---|---|---|
| 32 | bLength | 09h | |
| 33 | bDescriptorType | 02h | TYPE OF CONFIGURATION DESCRIPTOR |
| 34 | wTotalLength | 20h | TOTAL BYTES OF DESCRIPTOR DATA |
| 36 | bNumInterfaces | 01h | THE NUMBER OF INTERFACE |
| 37 | bConfigurationValue | 01h | INDEX OF CONFIGURATION (=2) |
| 38 | iConfiguration | 00h | INDEX OF CHARACTER STRING FOR PRESENT CONFIGURATION |
| 39 | bmAttributes | 80h | OPERATE WITH BUS POWER |
| 40 | MaxPower | 10h | CURRENT CONSUMPTION (=32mA) |
| 40-48 | Interface Descriptor | ** | INTERFACE DESCRIPTOR OF CONFIGURATION #2 |
| 49-55 | Endpoint Descriptor | ** | ENDPOINT DESCRIPTOR OF CONFIGURATION #2 |
| 56-62 | Endpoint Descriptor | ** | ENDPOINT DESCRIPTOR OF CONFIGURATION #2 |

F I G. 6A

| DEVICE | ADDRESS | NUMBER OF MODE | PRESENT MODE | CURRENT CONSUMPTION |
|---|---|---|---|---|
| USB HUB | Address01 | 1 | #1 | – |
| DEVICE A | Address02 | 2 | #1 | 100mA |
| ⋮ | ⋮ | ⋮ | ⋮ | ⋮ |

106a

F I G. 6B

106b

| MAXIMUM SUPPLY CURRENT | SUPPLY CURRENT (PRESENT VALUE) |
|---|---|
| 500mA | 100mA |

CONTROL SYSTEM, ELECTRONIC DEVICE AND IMAGE FORMING APPARATUS

CROSS-REFERENCE TO RELATED APPLICATIONS

This Nonprovisional application claims priority under 35 U.S.C. §119(a) on Patent Application No. 2005-261226 filed in Japan on Sep. 8, 2005, the entire contents for which are hereby incorporated by reference.

BACKGROUND OF THE INVENTION

1. Field of the Invention

The present invention relates to a control system, an electronic apparatus and an image forming apparatus, for managing the magnitude of the total current supplied to external devices connected via a hub in order to control operation at the time of the connection.

2. Description of Related Art

In recent years, some image forming apparatuses, such as copiers, printers and digital combination apparatuses, are equipped with a USB port, and a system that captures image data stored in an external device, such as a USB memory or a digital still camera, and outputs images has been proposed (see, for example, Japanese Patent Application Laid-Open No. 2004-109765).

In this kind of system, the image forming apparatus serves as a host apparatus and controls the external device serving as a device. The maximum current that can be supplied from one USB port provided in the host apparatus is 500 mA. Hence, in the case that a USB hub is connected to the USB port of the host apparatus and that no power is supplied to the USB hub from an AC adaptor or the like, the total current of the operating current of the USB hub and the currents that can be supplied to multiple USB devices connected to the USB hub is 500 mA.

The present USB specifications stipulate that a maximum current of 500 mA can be supplied from each USB port. Hence, in the case that the current consumption of a USB device to be connected is 500 mA or less, the USB device is configured so as to operate when connected. Because the current consumption of a USB device is generally low, multiple USB devices are frequently operated by only the current supplied from the host, and even when a USB hub is used, no power supply is connected to the USB hub.

However, in the case that a USB device having a high current consumption is connected, problems occur. For example, overcurrent protection is activated inside the USB port or the USB hub, and the USB device having the high current consumption cannot be connected electrically; or the operating voltage of the USB hub is lowered, and the operation of the USB hub itself and the operation of the USB device connected to the USB hub become unstable or impossible. In other words, although the maximum current that can be supplied is 500 mA, in the case that a large capacity device is connected, a large current is supplied to the device, and the above-mentioned problems will occur. As a result, there is a fear of adversely affecting the devices having been connected to the same USB hub.

BRIEF SUMMARY OF THE INVENTION

In consideration of the circumstances described above, the present invention is intended to provide a control system, an electronic device and an image forming apparatus, comprising supplying means for supplying currents to a hub connected to a port and external devices connected via the hub, and storage means for storing the magnitude of the total current supplied, wherein, in the case that a sufficient current cannot be supplied to a newly connected external device, power supply to the hub is urged or power supply to the other devices is reduced so that the current to be supplied to the newly connected device cab be obtained securely.

The control system according to the present invention comprises an electronic device, a hub and one or more external devices, wherein said electronic device comprises a port, a supplying section for supplying currents to said hub connected to said port and said external devices connected via said hub, a storage section for storing the magnitude of the total current supplied from said supplying section and a controller capable of controlling operations of said external devices.

According to the present invention, the electronic device comprises the supplying means for supplying currents to the hub connected to the port and the external devices connected via the hub, and the storage means for storing the magnitude of the total current supplied. Hence, power management can be carried out on the basis of the information stored in the storage means.

The control system according to the present invention is characterized in that the external device comprises a storage section for storing information about current consumption and a transmission section for transmitting said information in accordance with a transmission request from the outside, and said electronic device further comprises, a transmitting section for transmitting a transmission request for said information to said external device when said external device is connected via said hub, a receiving section for receiving said information transmitted from said external device in accordance with said transmission request; wherein said controller is further capable of performing an operation of calculating the magnitude of the total current supplied from said supplying section based on the received information.

According to the present invention, in the external device, information on its current consumption is stored, and the electronic device obtains this information when the external device is connected. Hence, the electronic device can calculate the magnitude of the total current to be supplied on the basis of the obtained information, and power management can be carried out on the basis of the magnitude of the calculated total current.

The control system according to the present invention is characterized in that said controller is further capable of performing operations of calculating the magnitude of a current that can be supplied to a new external device based on the magnitude of the total current stored in said storage section when said new external device is connected via said hub and notifying the calculated magnitude of the current to said external device, and said external device further comprises a judging section for judging whether said external device is operable based on the magnitude of the current notified from said electronic device and a notifying section for notifying the judgment result made by said judging section to said electronic device.

According to the present invention, the electronic device notifies to a newly connected external device the magnitude of the current that can be supplied, and the newly connected external device judges whether the external device is operable on the basis of the notified magnitude of the current. The result of the judgment is notified to the electronic device, whereby power management can be carried out depending on whether the external device is operable.

The control system according to the present invention is characterized in that said controller is further capable of performing operations of judging whether another external device is connected to said hub when the judgment result notified from said newly connected external device is that said newly connected external device is inoperable and when it is judged that another external device is connected, reducing current supply to said another external device.

According to the present invention, the electronic device judges whether another external device is connected to the hub in the case that the result of the judgment notified from the newly connected external device is that the newly connected external device is inoperable, and reduces the current supplied to the other external device in the case that the other external device is connected. Hence, the current to be supplied to the newly connected external device is obtained securely.

The control system according to the present invention is characterized in that said controller is further capable of performing operations of judging whether another external device is connected to said hub when the judgment result notified from said newly connected external device is that said newly connected external device is inoperable and when it is judged that another external device is connected, stopping current supply to another external device.

According to the present invention, the electronic device judges whether another external device is connected to the hub in the case that the result of the judgment notified from the newly connected external device is that the newly connected external device is inoperable, and stops current supply to the other external device in the case that the other external device is connected. Hence, the current to be supplied to the newly connected external device is obtained securely.

The control system according to the present invention is characterized in that said hub is operable by a current supplied from an external power supply, and said controller is further capable of performing an operation of providing information saying that a current should be supplied to said hub from said external power supply when the judgment result notified from said newly connected external device is that said newly connected external device is inoperable.

According to the present invention, the electronic device notifies information saying that the current should be supplied to the hub in the case that the result of the judgment notified from the newly connected external device is that the newly connected external device is inoperable. Hence, in the case that the current is supplied to the hub, the current to be supplied to the newly connected external device is obtained securely.

The control system according to the present invention is characterized in that said external device further comprises a storage section for storing image data, and said controller is further capable of performing operations of capturing the image data stored in said external device when information saying that said external device is operable is received from said external device connected via said hub and forming images on a sheet based on the captured image data.

According to the present invention, the image data stored in the external device is captured in the electronic device, and images are formed on a sheet on the basis of the captured data. Hence, the present invention is applicable to a system comprising, for example, a printer, a digital combination apparatus, and an external device, such as a USB memory.

An electronic device according to the present invention comprises a port, a supplying section for supplying currents to a hub connected to said port and external devices connected via said hub, a storage section for storing the magnitude of the total current supplied from said supplying section and a controller capable of controlling operations of said external devices.

According to the present invention, the electronic device comprises the supplying means for supplying currents to the hub connected to the port and the external devices connected via the hub, and the storage means for storing the magnitude of the total current supplied. Hence, power management can be carried out on the basis of the information stored in the storage means.

The electronic device according to the present invention is characterized in that said controller is further capable of performing operations of obtaining information about current consumption from an external device connected via said hub and calculating the magnitude of the total current to be supplied from said supplying section based on the obtained information.

According to the present invention, in the external device, information on its current consumption is stored, and the electronic device obtains this information when the external device is connected. Hence, the electronic device can calculate the magnitude of the total current to be supplied on the basis of the obtained information, and power management can be carried out on the basis of the magnitude of the calculated total current.

The electronic device according to the present invention is characterized in that said controller is further capable of performing operations of calculating the magnitude of the current that can be supplied to a new external device based on the magnitude of the total current stored in said storage section when said new external device is connected via said hub and notifying the calculated magnitude of the current to said external device.

According to the present invention, the electronic device notifies to the newly connected external device the magnitude of the current that can be supplied, and the newly connected external device judges whether the external device is operable on the basis of the notified magnitude of the current. The result of the judgment is notified to the electronic device, whereby power management can be carried out depending on whether the external device is operable.

The electronic device according to the present invention is characterized in that said controller is further capable of performing operations of obtaining information about operability or inoperability judged by said newly connected external device when the magnitude of the current that can be supplied is notified, judging whether another external device is connected to said hub when the obtained information says that said newly connected external device is inoperable and when it is judged that another external device is connected, reducing current supply to said another external device.

According to the present invention, the electronic device judges whether another external device is connected to the hub in the case that the result of the judgment notified from the newly connected external device is that the newly connected external device is inoperable, and reduces the current supplied to the other external device in the case that the other external device is connected. Hence, the current to be supplied to the newly connected external device is obtained securely.

The electronic device according to the present invention is characterized in that said controller is further capable of performing operations of obtaining information about operability or inoperability judged by said newly connected external device when the magnitude of the current that can be supplied is notified, judging whether another external device is connected to said hub when the obtained information says that said newly connected external device is inoperable; and when it is judged that another external device is connected, stopping current supply to said another external device.

According to the present invention, the electronic device judges whether another external device is connected to the hub in the case that the result of the judgment notified from the newly connected external device is that the newly connected external device is inoperable, and stops current supply to the other external device in the case that it is judged that the other external device is connected. Hence, the current to be supplied to the newly connected external device is obtained securely.

The electronic device according to the present invention is characterized in that said hub can be operated by a current supplied from the external power supply, and said controller is further capable of performing operations of obtaining information about operability or inoperability judged by said newly connected external device when the magnitude of the current that can be supplied is notified and providing information saying that a current should be supplied to said hub from said external power supply when the obtained information says that said newly connected external device is inoperable.

According to the present invention, the electronic device notifies information saying that current should be supplied to the hub in the case that the result of the judgment notified from the newly connected external device is that the newly connected external device is inoperable. Hence, in the case that the current is supplied to the hub, the current to be supplied to the newly connected external device is obtained securely.

The electronic device according to the present invention is characterized in that said external device further comprises a storage section for storing image data, and said controller is further capable of performing operations of capturing the image data stored in said external device when information saying that said external device is operable is received from said external device connected via said hub and forming images on a sheet based on the captured image data.

According to the present invention, the image data stored in the external device is captured in the electronic device, and images are formed on a sheet on the basis of the captured data. Hence, the present invention is applicable to a system comprising, for example, a printer, a digital combination apparatus, and an external device, such as a USB memory.

An image forming apparatus according to the present invention comprises a port, an image forming section for forming images on a sheet by capturing image data from one or more external devices connected to said port via a hub, a supplying section for supplying currents to said hub connected to said port and said external devices connected via said hub and a storage section for storing the magnitude of the total current supplied from said supplying section.

According to the present invention, the image forming apparatus comprises the supplying means for supplying currents to the hub connected to the port and the external devices connected via the hub, and the storage means for storing the magnitude of the total current supplied. Hence, power management can be carried out on the basis of the information stored in the storage means.

The electronic device according to the present invention comprises the supplying means for supplying currents to the hub connected to the port and the external devices connected via the hub, and the storage means for storing the magnitude of the total current supplied. Hence, the electronic device can carry out power management on the basis of the information stored in the storage means. The external device is prevented from being connected in a state in which current supply is insufficient. As a result, the connected external device can be prevented from becoming inoperable.

According to the present invention, in the external device, information on its current consumption is stored, and the electronic device obtains this information when the external device is connected. Hence, the electronic device can calculate the magnitude of the total current to be supplied on the basis of the obtained information, and power management can be carried out on the basis of the magnitude of the calculated total current.

According to the present invention, the electronic device notifies to a newly connected external device the magnitude of the current that can be supplied, and the newly connected external device judges whether the external device is operable on the basis of the notified magnitude of the current. The result of the judgment is notified to the electronic device, whereby power management can be carried out depending on whether the external device is operable. In the case that the newly connected external device is inoperable, the current to be supplied to another external device is reduced or stopped, whereby current supply to the newly connected external device can be obtained securely. In other words, current supply can be carried out preferentially to the external device that is newly connected so as to be used by the user, and it is possible to reduce situations in which the external device cannot be used owing to insufficient supply current.

According to the present invention, the electronic device judges whether another external device is connected to the hub in the case that the result of the judgment notified from the newly connected external device is that the newly connected external device is inoperable, and reduces the current supplied to the other external device in the case that the other external device is connected. Hence, the current to be supplied to the newly connected external device can be obtained securely, and it is possible to reduce situations in which the external device cannot be used owing to insufficient supply current.

According to the present invention, the electronic device judges whether another external device is connected to the hub in the case that the result of the judgment notified from the newly connected external device is that the newly connected external device is inoperable, and stops current supply to the other external device in the case that the other external device is connected. Hence, the current to be supplied to the newly connected external device can be obtained securely, and it is possible to reduce situations in which the external device cannot be used owing to insufficient supply current.

According to the present invention, in the case that the result of the judgment notified from the newly connected external device is that the newly connected external device is inoperable, the electronic device notifies information saying that current should be supplied to the hub. Hence, in the case that the current is supplied to the hub, the current to be supplied to the newly connected external device can be obtained securely, and it is possible to reduce situations in which the external device cannot be used owing to insufficient supply current.

According to the present invention, the image data stored in the external device is captured in the electronic device, and images are formed on a sheet on the basis of the captured data. Hence, the present invention is applicable to a system comprising, for example, a printer, a digital combination apparatus, and an external device, such as a USB memory.

The above and further objects and features of the invention will more fully be apparent from the following detailed description with accompanying drawings.

BRIEF DESCRIPTION OF THE SEVERAL VIEWS OF THE DRAWINGS

FIG. 3 is a conceptual view showing examples of device descriptors;

FIG. 4 is a conceptual view showing examples of configuration descriptors;

FIG. 5 is a conceptual view showing examples of configuration descriptors;

FIG. 6A and FIG. 6B are conceptual views showing examples of a device management table and a supply current management table;

DETAILED DESCRIPTION OF THE INVENTION

The present invention will be described below specifically on the basis of the drawings showing the embodiments thereof.

Embodiment 1

Figure 1:
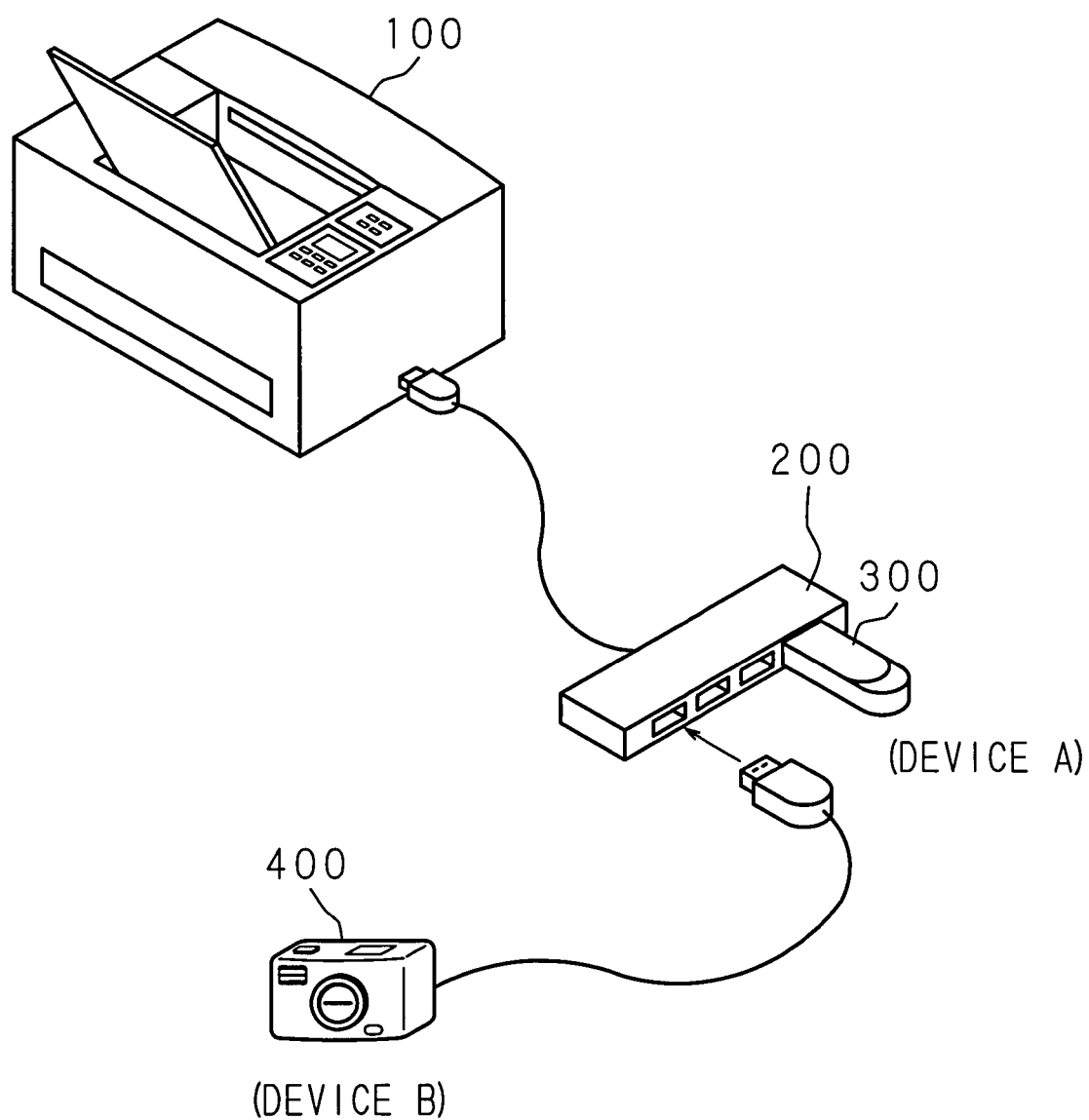
FIG. 1 is a schematic view illustrating the configuration of a control system according to an embodiment.

FIG. 1 is a schematic view illustrating the configuration of a control system according to this embodiment. Numeral 100 in the figure designates an image forming apparatus serving as a USB host. The image forming apparatus 100 is equipped with one USB port (port 107b; see FIG. 2), and controls the operation of a USB device connected to this port 107b or the operation of a USB device connected to this port 107b via a USB hub. A USB device to be controlled by the image forming apparatus 100 is a USB memory, an HDD apparatus, an MO drive, a digital camera, etc. A USB hub 200 equipped with four USB ports (ports 202a to 202d; see FIG. 2) is connected to the image forming apparatus 100 shown in FIG. 1, and a USB memory 300 has already been connected to the port 202d, one of the ports of this USB hub 200. In addition, a digital camera 400 serving as a new USB device is going to be connected to an empty port.

Generally, the USB specifications stipulate that the upper limit value of the current that can be supplied from a USB host via one USB port is 500 mA in the case that power is supplied to the USB hub 200, and that the upper limit value is 100 mA in the case that no power is supplied thereto. Hence, when a new device is connected, and if the magnitude of the current supplied to the device is more than the upper limit value described above, problems occur. For example, overcurrent protection is activated at the USB port 107b, the USB hub 200, etc., and the operation of the USB device connected via the USB hub 200 becomes unstable or impossible.

Accordingly, this embodiment is configured so that the total current supplied to devices including the USB hub 200 is managed in the image forming apparatus 100 and so that, in the case that the supplied current is insufficient, the user is urged to supply power to the USB hub 200, whereby the power to be supplied to the devices is obtained securely.

In addition, in Embodiment 2 and the following embodiments, a configuration is described in which, in the case that another device has been connected to the USB hub 200, the operation mode of the device is changed so that the power to be supplied to a newly connected device is obtained securely, and another configuration is also described in which, in the case that another device has been connected to the USB hub 200, the connection of the device is disconnected so that the power to be supplied to the newly connected device is obtained securely.

Figure 2:
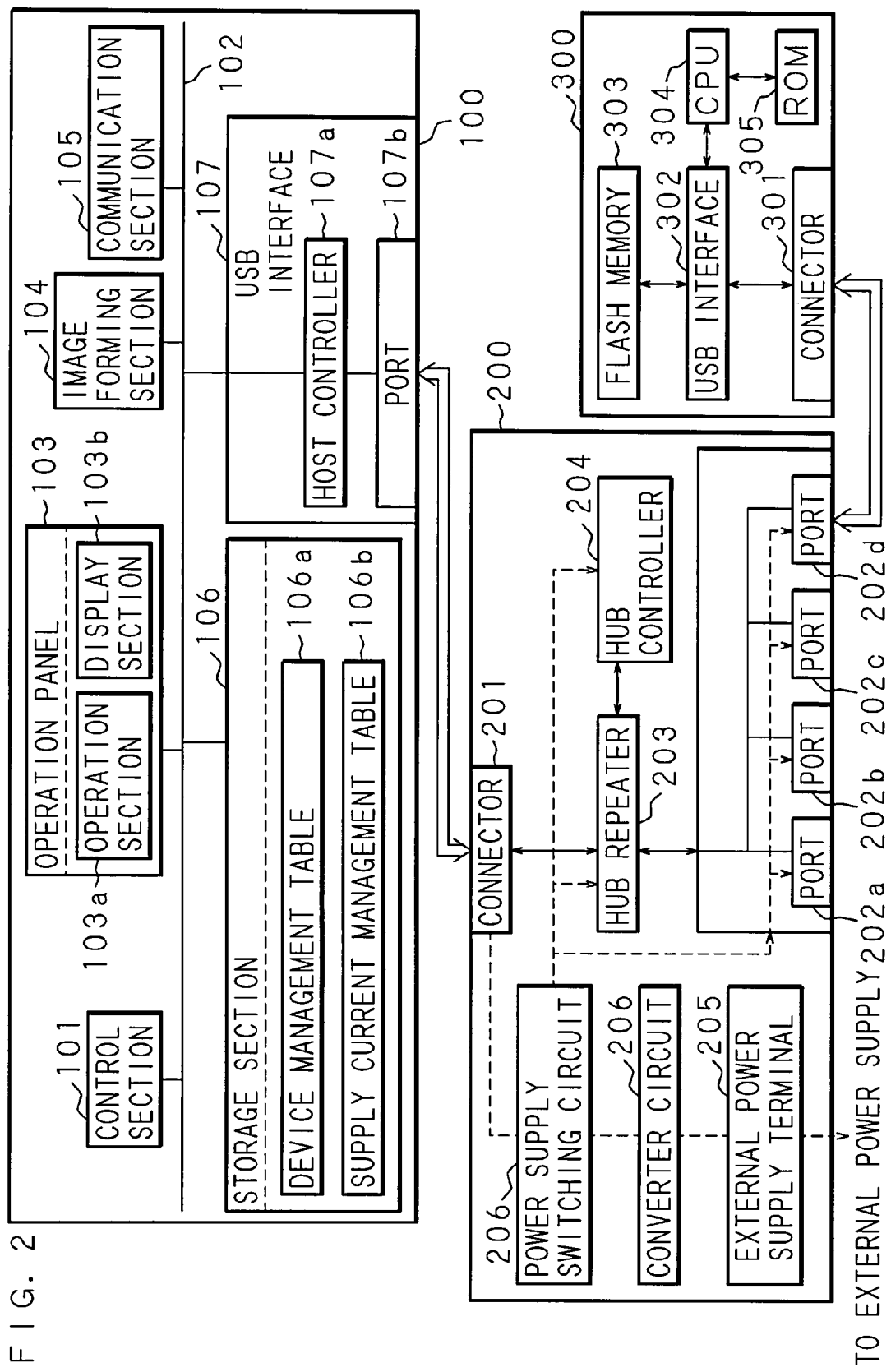
FIG. 2 is a block diagram illustrating the internal configurations of an image forming apparatus, a USB hub, and a USB memory.

FIG. 2 is a block diagram illustrating the internal configurations of the image forming apparatus 100, the USB hub 200 and the USB memory 300. The image forming apparatus 100 is equipped with a control section 101. Hardware devices, such as an operation panel 103, an image forming section 104, a communication section 105, a storage section 106 and a USB interface 107, are connected to this control section 101 via a bus 102. The control section 101 contains a CPU, a ROM and a RAM. The CPU inside the control section 101 loads control programs previously stored in the ROM into the RAM, and executes the programs, thereby controlling the above-mentioned hardware devices, and operating the image forming apparatus 100 as an electronic device according to the present invention.

The operation panel 103 comprises an operation section 103a that receives operation instructions from the user, and a display section 103b that displays information to be notified to the user. The operation section 103a is equipped with various hardware keys and accepts various settings during image formation. The display section 103b is equipped with a liquid crystal display or an LED display, and is used to display the operation states of the image forming apparatus 100 and the setting values having been input via the operation section 103a.

The image forming section 104 forms images on a sheet on the basis of image data captured from the outside. The image forming apparatus 100 is equipped with two interfaces described later to capture image data from the outside. To form images on a sheet, the image forming section 104 comprises a charger that charges a photoconductive drum to a predetermined potential, a laser writing unit that emits laser light according to image data received from the outside and generates an electrostatic latent image on the surface of the photoconductive drum, a developing unit that supplies toner to the electrostatic latent image formed on the surface of the photoconductive drum and renders the image visible, and a transferring unit that transfers the toner image formed on the surface of the photoconductive drum to a sheet (these are not shown). Hence, the image desired by the user is formed on the sheet according to the electrophotographic system. Instead of the electrophotographic system using the laser writing unit, the inkjet system, thermal transfer system, sublimation system, etc. may also be used.

The communication section 105 is equipped with a network interface that carries out communication with an information processing apparatus, such as a personal computer. After a communication link is established between the information processing apparatus and the network interface, the communication section 105 receives a print job transmitted from the information processing apparatus and transmits information to be notified to the information processing apparatus. When the communication section 105 has received the print job, the print job is developed into bit-mapped image data, and the developed image data is transferred to the image forming section 104.

The storage section 106 is formed of a nonvolatile semiconductor memory, an HDD apparatus or the like, and part of the storage section is used as a device management table 106a that manages the information of a USB device (device) to be connected to the USB interface 107 and is also used as a supply current management table 106b that manages the magnitude of the current to be supplied to the connected device. Information to be registered in the device management table 106a is created using the control section 101 in the case that a device is connected to the port 202d or in the case that a device is connected thereto via the USB hub. The information created using the control section 101 is written in appropriate regions of the device management table 106a. In addition, the information having been registered in the device management table 106a is read when a new device is connected, and the information is used to manage the current to be supplied. The information to be registered in the supply current management table 106b includes the upper limit value of the current that can be supplied from the port 107b, and the present value of the supply current. As the upper limit value of the supply current, 500 mA is registered in the case that a self-power USB hub is connected to the port 107b, and 100 mA is registered in the case that no USB hub is connected or a bus-power USB hub is connected. Furthermore, when a new device is connected, the present value of the supply current is calculated on the basis of the information on the current consumption of the device, and the value in the supply current management table 106b is renewed.

The USB interface 107 is equipped with the port 107b to which a USB device (device) is connected and a host controller 107a that controls communication with the USB device connected to the port 107b. The host controller 107a comprises, for example, a storage section that stores various control data (commands) for controlling communication with the connected device, and a control section that carries out communication control by reading necessary control data from this control section and by outputting the data to the device at appropriate timing. In the case that the USB device connected to the USB interface 107 is a storage device, such as a USB memory, the USB interface 107 is configured so that the image data stored in this storage device can be captured. The image data captured via the USB interface 107 is transferred to the image forming section 104, and the image forming section 104 carries out image formation on the basis of the image data.

The USB hub 200 has a connector 201 on the upstream side and has the ports 202a to 202d on the downstream side, and the connector and the ports are connected via a hub repeater 203 and a hub controller 204. The connector 201 on the upstream side is connected to the image forming apparatus 100 serving as a USB host. In addition, USB devices that are controlled by the USB host are connected to the ports 202a to 202d on the downstream side. The hub repeater 203 detects the connection/removal of a USB device to/from the ports 202a to 202d, and delivers control data transmitted from the USB host to an appropriate port, that is, the port 202a (or the ports 202b to 202d). On the other hand, the hub controller 204 carries out control to allow the USB device to gain access to the bus by controlling communication mainly between the USB hub 200 and the image forming apparatus 100.

Furthermore, the USB hub 200 has an external power supply terminal 205 to receive power supplied from an external power supply, such as a commercial power supply. The external power supply terminal 205 is connected to a power supply switching circuit 207 via a converter circuit 206. In the case that no external power supply is connected to the external power supply terminal 205, the power supply switching circuit 207 switches the source of the power supply so that the bus power supplied from the upstream side is supplied to the USB devices on the downstream side, the hub repeater 203 and the hub controller 204. On the other hand, in the case that an external power supply is connected to the external power supply terminal 205, the power supply switching circuit 207 switches the source of the power supply so that the power supplied from the external power supply is supplied to the USB devices on the downstream side, the hub repeater 203 and the hub controller 204.

The USB memory 300 has a connector 301 connected to a USB port, a USB interface 302 that controls communication with the USB host, a flash memory 303 that stores any data, a ROM 305 that stores various control programs and data, and a CPU 304 that reads the control programs and data from the ROM 305 and controls the whole device. The data stored in the ROM 305 includes device descriptors representing information on the device and configuration descriptors representing information on the operation conditions of the device.

FIG. 3 is a conceptual view showing examples of device descriptors, and FIG. 4 and FIG. 5 are conceptual views showing examples of configuration descriptors. Information on a USB device (device), such as indexes specified by character strings indicating the USB version, vender ID, product ID, manufacturer name and product name, is described in the device descriptors as shown in FIG. 3. In addition, the number of configurations (operation modes) supported by the device is described in the device descriptors. The device having the device descriptors shown in FIG. 3 supports two operation modes. On the other hand, information of each configuration (operation mode) is stored in the configuration descriptors. The device having the configuration descriptors shown in FIG. 4 and FIG. 5 has two operation modes. It is described that, in one operation mode, the device operates with a current consumption of 100 mA, and that, in the other operation mode, the device operates with a current consumption of 32 mA.

The image forming apparatus 100 serving as a USB host obtains the above-mentioned device descriptors and configuration descriptors from the USB device connected to the port 107b. These descriptors include information on the operation modes and information on the current consumption in each operation mode. After obtaining the descriptors, the image forming apparatus 100 renews the device management table 106a and the supply current management table 106b on the basis of the information.

FIG. 6A and FIG. 6B are conceptual views showing examples of the device management table 106a and the supply current management table 106b. In the device management table 106a shown in FIG. 6A, information for identifying connected devices, addresses assigned by the image forming apparatus 100 at the time of connection, the number of operation modes supported by connected devices, information on the operation mode being set at the present time, etc. are stored so as to be related to one another. On the other hand, in the supply current management table 106b shown in FIG. 6B, the upper limit value of the current that can be supplied to a device and the magnitude of the current being supplied to the device at the present time are stored. For example, in the case that the USB hub 200 is connected to the port 107b of the image forming apparatus 100 and that power is supplied to the USB hub 200, the maximum supply current is 500 mA because the maximum current of 500 mA can be supplied to the downstream side of the USB hub 200. In the case that the current consumption in the operation mode of the connected device is 100 mA, the present value of the supply current is 100 mA.

Figure 7:
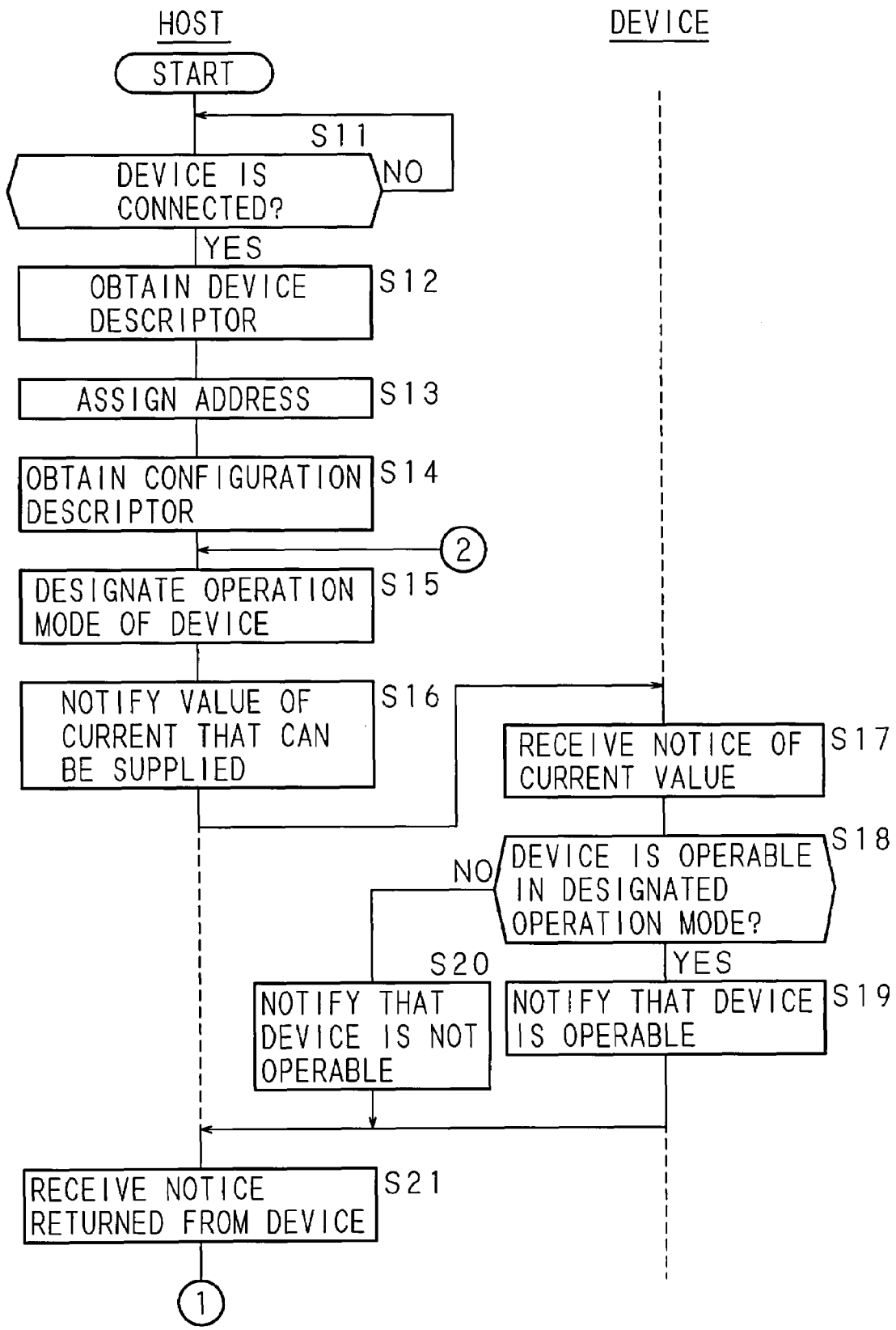
FIG. 7 is a flowchart illustrating an operation procedure in the case that a USB device is newly connected.
Figure 8:
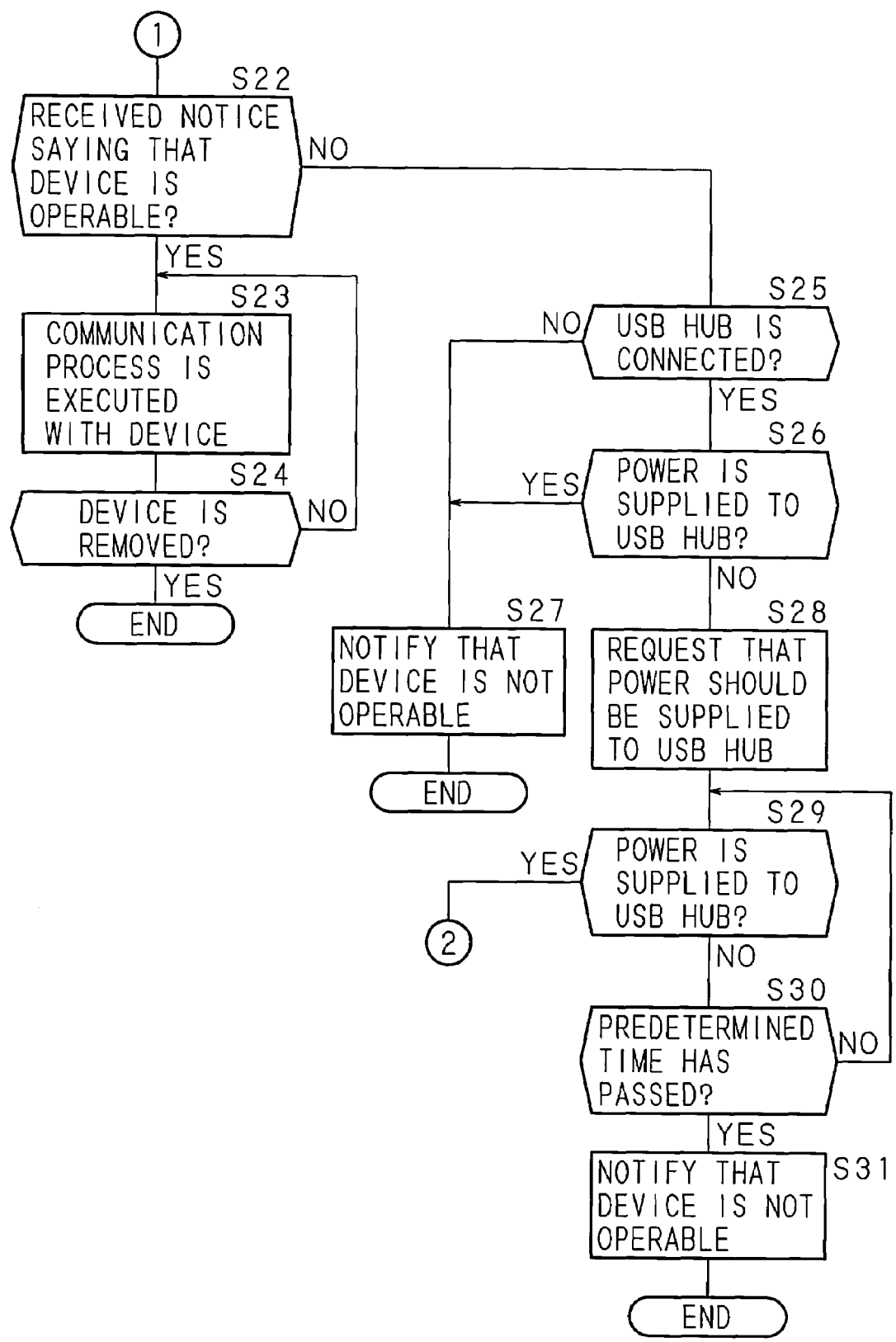
FIG. 8 is a flowchart illustrating an operation procedure in the case that a USB device is newly connected.

The operation of the control system according to this embodiment will be described below. FIG. 7 and FIG. 8 are flowcharts illustrating an operation procedure in the case that a USB device is newly connected. The host controller 107a inside the USB interface 107 built in the image forming apparatus 100 first judges whether a new device is connected to the port 107b (at step S11). The host controller judges the connection of the device by detecting that the potential at the D+ terminal (or the D− terminal) of the port 107b has reached a predetermined potential. In the case that the host controller judges that no device is connected (NO at step S11), the host controller stands by until a device is connected.

In the case that the connection of a device is detected (YES at step S11), the host controller 107a outputs a reset signal for a constant time or more. In other words, the host controller outputs a low signal to the D+ terminal (or the D− terminal). The device side to which the low signal is input is internally reset, and enters a state in which communication is possible by control transfer.

Next, the host controller 107a executes configuration. For this purpose, the host controller 107a first outputs "Get_Descriptor(Device)" command, and requests the transfer of the device descriptors held inside the device. The host controller 107a obtains the device descriptors transferred from the device in response to the request (at step S12). The obtained device descriptors include the number of configurations (operation modes) to be supported, in addition to information on the device, such as the product ID, serial number, etc. These items of information are notified to the CPU 101 via the host controller 107a. Next, the host controller 107a transfers "Set_Address" command to the device to assign an unused address thereto (at step S13). At this time, the device side has a specific address, and communication can be carried out after this step using this address.

Next, the host controller 107a outputs "Get_Descriptor(Configuration)" command, and requests the transfer of the configuration descriptors held inside the device. The host controller 107a obtains the configuration descriptors transferred from the device in response to the request (at step S14). The obtained configuration descriptors include the information on the current consumption in each configuration (operation mode). These items of information are notified to the CPU 101 via the host controller 107a. Upon receipt of the notice, the CPU 101 renews the registrations in the device management table 106a on the basis of the information.

After the completion of the configuration in the USB interface 107, the CPU 101 refers to the registrations in the device management table 106a, and designates the recommended operation mode of the device (at step S15). For example, in the case that the connected device has two operation modes, the operation mode requiring higher current consumption is designated so that the device can be used in a proper state. The CPU 101 causes the host controller 107a of the USB interface 107 to output "Set_Configuration(Configuration #N)" command, whereby the designation of the operation mode is attained. Herein, #N is identification information that is used to identify the configuration (operation mode).

Next, the CPU 101 refers to the registrations in the supply current management table 106b, and notifies the value of current that can be supplied (at step S16). For example, in the case that the value of the maximum supply current is 500 mA and that the present value of the supply current is 100 mA as described in the supply current management table 106b shown in FIG. 6B, a notice saying that the value of the current that can be supplied is 400 mA is issued. Issuing the notice of the value of the current that can be supplied is attained by outputting a command unique to the control system from the host controller 107a.

In the case that the device receives the notice of the current value (at step S17), the CPU of the device judges whether the device is operable in the operation mode designated at step S15 (at step S18). In the case that the current consumed in the designated operation mode is smaller than the current value notified, the CPU judged that the device is operable (YES at step S18), and transmits a stall packet to the image forming apparatus 100, thereby issuing a notice saying that the device is operable (at step S19). On the other hand, in the case that the current consumed in the designated operation mode is larger than the current value notified, the CPU judges that the device is inoperable (NO at step S18), and transmits a null packet is to the image forming apparatus 100, thereby issuing a notice saying that the device is inoperable to the image forming apparatus 100 (at step S20).

In the case that the image forming apparatus 100 receives the notice returned from the device (at step S21), the CPU 101 judged whether the received notice says that the device is operable (at step S22). In other words, the CPU 101 judges whether the stall packet or the null packet is received via the USB interface 107, whereby the CPU 101 can judge whether the received notice is a notice saying that the device is operable. In the case that the CPU 101 judges that the received notice is a notice saying that the device is operable (YES at step S22), the current having a magnitude required for the device is supplied, and communication with the device is carries out (at step S23). Next, the host controller 107a detects the change in the potential at the D+ terminal (or the D− terminal) of the port 107b, thereby judging whether the device is removed (at step S24). In the case that it is judged that the device is removed (YES at step S24), the processing in this flowchart is completed. In the case that it is judged that the device is not removed (NO at step S24), the CPU 101 returns the processing to step S23.

Furthermore, in the case that it is judged at step S22 that the notice returned from the device is a notice saying that the device is inoperable (NO at step S22), the CPU 101 refers to the registrations in the device management table 106a, and judges whether a USB hub is connected (at step S25). In the case that the CPU 101 judges that no USB hub is connected (NO at step S25), because the magnitude of the current to be supplied to the device cannot be increased, the CPU 101 notifies information saying that the connected device is inoperable (at step S27). More specifically, character information saying that the device is inoperable is displayed on the display section 103b of the operation panel 103. Furthermore, it may be possible to use a configuration in which an output means for outputting sound, alarm sound, etc. is provided so that the information is notified using sound, alarm sound, etc. output from this output means.

In the case that the CPU 101 judges that a USB hub is connected (YES at step S25), the CPU 101 judges whether power is supplied to the USB hub (at step S26). In the case that the CPU 101 judges that power has already been supplied to the USB hub (YES at step S26), because the magnitude of the current to be supplied to the device connected to the downstream side of the USB hub cannot be increased, the CPU 101 notifies information saying that the device is inoperable (at step S27). Furthermore, in the case that the CPU 101 judges that power is not supplied to the USB hub (NO at step S26), the CPU 101 requests that power should be supplied to the USB hub (at step S28). More specifically, the CPU 101 displays information saying that power should be supplied to the USB hub on the display section 103b of the operation panel 103 to notify to the user that a power adaptor or the like is required to be connected.

Next, on the basis of the information notified from the USB interface 107, the CPU 101 judge whether power is supplied to the USB hub (at step S29). In the case that the CPU 101 judges that power is not supplied to the USB hub (NO at step S29), the CPU 101 refers to the output of the timer built therein and judges whether a predetermined time has passed after the power supply was requested (at step S30). In the case that the CPU 101 judges that the predetermined time has not passed (NO at step S30), the CPU 101 returns the processing to step S29. In the case that the CPU 101 judges that the predetermined time has passed (YES at step S30), the CPU 101 displays character information on the display section 103b of the operation panel 103 to notify to the user that the device is inoperable (at step S31).

On the other hand, in the case that the CPU 101 judges that power is supplied to the USB hub (YES at step S29), the CPU 101 returns the processing to step S15. At this time, the CPU 101 controls the host controller 107a of the USB interface 107 to designate the operation mode of the device again. Herein, the CPU 101 designates the same operation mode as the operation mode designated at the last time. When the value of the current that can be supplied is notified at step S16, because power is begun to be supplied to the USB hub, a current value larger than that at the last time can be notified. In the case that the device is operable on the basis of the current value notified, the image forming apparatus 100 can communicate with the device. At the time when the device is removed from the USB hub, the processing in this flowchart is completed. Moreover, in the case that the device is inoperable, a notice saying that the device is inoperable is issued eventually at step S27, and the processing in this flowchart is completed.

Embodiment 2

Embodiment 1 is configured so that, in the case that the device side judges that the device is inoperable in the operation mode designated by the image forming apparatus 100 owing to insufficient power supply, the user is urged to supply power to the USB hub. However, in the case that another device is connected to the USB hub, it may be possible to have a configuration in which the operation mode of the other device is changed to reduce supply current and to securely obtain power to be supplied to the newly connected device. The configuration of the hardware is the same as that of Embodiment 1.

Figure 9:
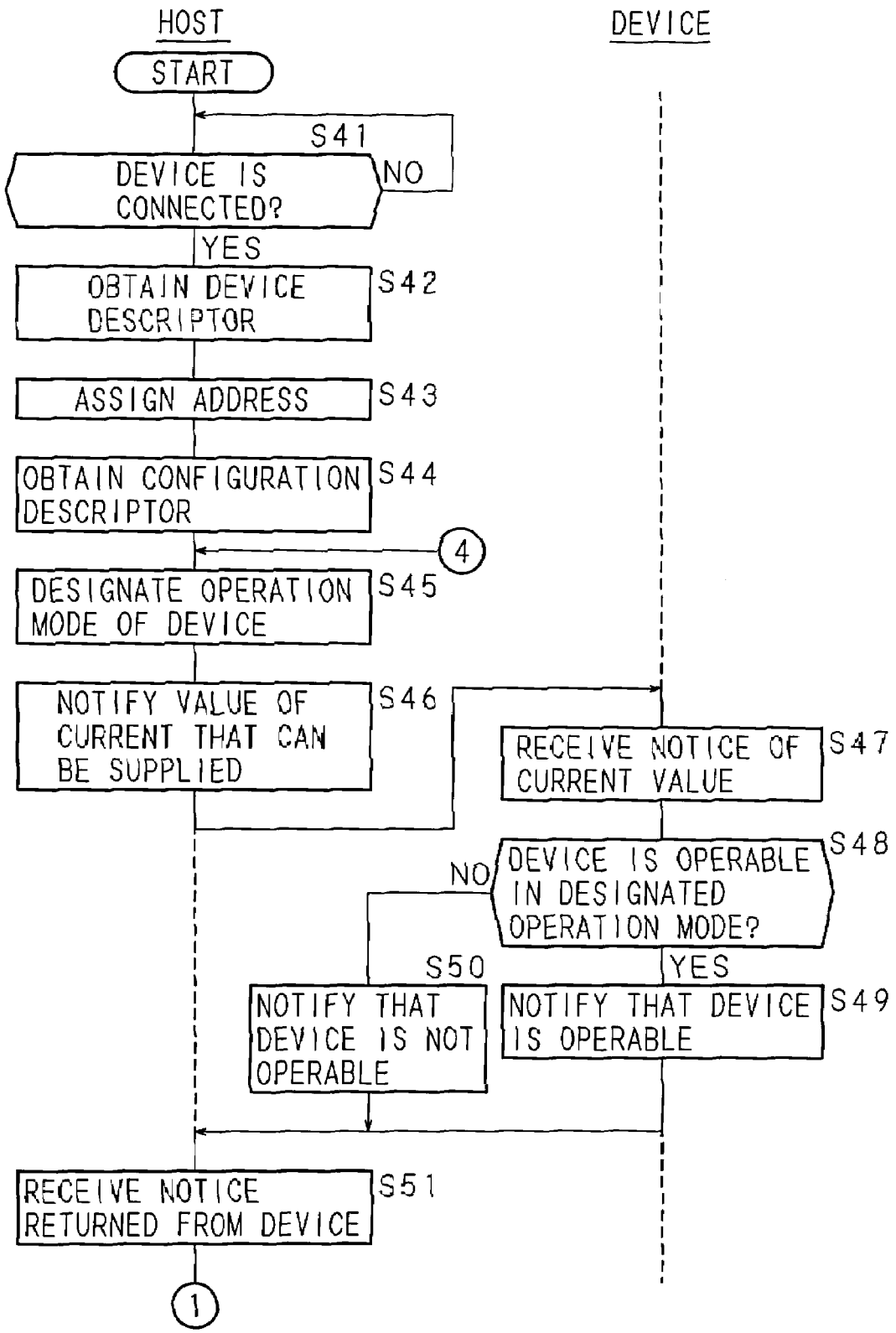
FIG. 9 is a flowchart illustrating an operation procedure in the case that a USB device is newly connected.
Figure 10:
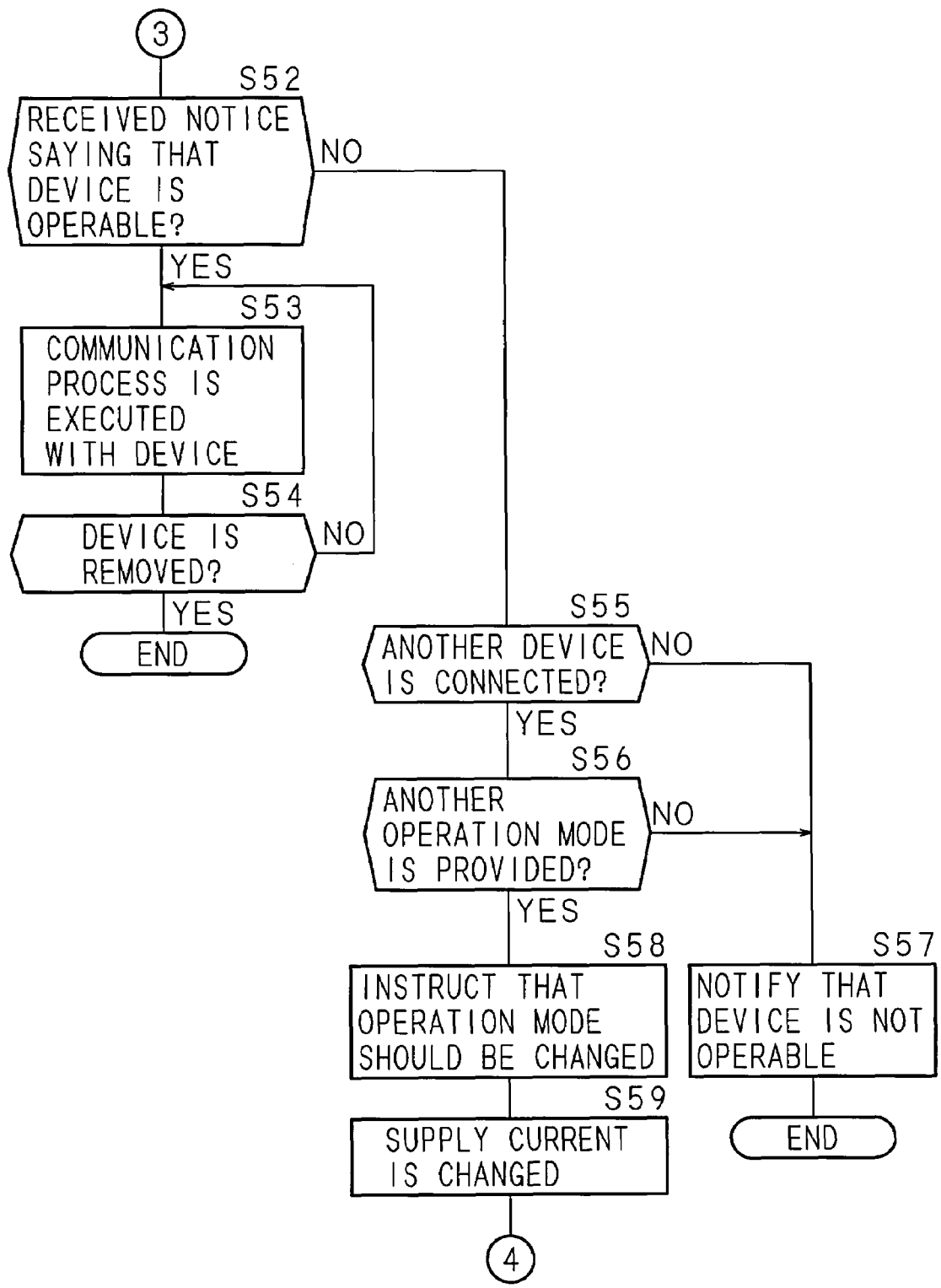
FIG. 10 is a flowchart illustrating an operation procedure in the case that a USB device is newly connected.

FIG. 9 and FIG. 10 are flowcharts illustrating an operation procedure in the case that a USB device is newly connected. The processing steps from the detection of a newly connected device to the reception of a notice regarding whether the device is operable are carried out in the same way as in Embodiment 1 (step S41 to step S51). In the case that the image forming apparatus 100 has received the notice returned from the device (at step S51), the CPU 101 judges whether the received notice is a notice saying that the device is operable (at step S52).

In the case that it is judged that the received notice is a notice saying that the device is operable (YES at step S52), the magnitude of the current required for the device is supplied, and communication processing with the device is carried out (at step S53). Next, the host controller 107a detects the change in the potential of the D+ terminal (or the D− terminal) of the port 107b, thereby judging whether the device is removed (at step S54). In the case that it is judged that the device is removed (YES at step S54), the processing in this flowchart is completed. In the case that it is judged that the device is not removed (NO at step S54), the CPU 101 returns the processing to step S53.

Furthermore, in the case that it is judged at step S52 that the notice returned from the newly connected device is a notice saying that the device is inoperable (NO at step S52), the CPU 101 refers to the registrations in the device management table 106a, and judges whether another device is connected to the USB hub (at step S55). In the case that the CPU 101 judges that the other device is not connected (NO at step S55), because the magnitude of the current to be supplied to the newly connected device cannot be increased, the CPU 101 notifies information saying that the newly connected device is inoperable (at step S57).

In the case that the CPU 101 judges that the other device is connected (YES at step S55), the CPU 101 refers to the registrations in the device management table 106a, and judges whether the other device has another operation mode (at step S56). In the case that the CPU 101 judges that the other device does not have the other operation mode (NO at step S56), because the magnitude of the current to be supplied to the newly connected device cannot be increased, the CPU 101 displays character information on the display section 103b of the operation panel 103 to notify that the newly connected device is inoperable (at step S57).

In the case that the CPU 101 judges at step S56 that the other device has the other operation mode (YES at step S56), the CPU 101 instructs that the operation mode should be changed (at step S58). When the operation mode of the newly connected device is designated at step S45, the operation mode requiring higher current consumption is designated so that the device can operate in a proper state. Hence, the magnitude of the current to be supplied to the other device can be reduced by changing the operation mode thereof, and the power to the newly connected device can be obtained securely.

After the change of the operation mode is instructed, the magnitude of the current to be supplied to the other device, the operation mode of which is changed, is changed (at step S59), and the processing is returned to step S45. At this time, the CPU 101 controls the host controller 107a of the USB interface 107 to designate the operation mode of the newly connected device again. Herein, the CPU 101 designates the same operation mode as the operation mode designated at the last time. When the value of the current that can be supplied is notified at step S46, because the power to be supplied to the other device is reduced, a current value larger than that at the last time can be notified. In the case that the newly connected device is operable on the basis of the current value notified, the image forming apparatus 100 can communicate with the device. At the time when the device is removed from the USB hub, the processing in this flowchart is completed. Moreover, in the case that the device is inoperable, a notice saying that the device is inoperable is issued eventually at step S57, and the processing in this flowchart is completed.

In this embodiment, when a new device is connected and in the case that it is judged that the device cannot operate owing to insufficient power supply, the magnitude of the current to be supplied to another device is reduced, whereby the power to be supplied to the newly connected device is obtained securely as described above. In other words, the power supply to the device that is going to be used by the user is carried out preferentially. Therefore, it is possible to reduce situations in which the newly connected device cannot be used owing to insufficient supply current.

It may be possible to have a configuration wherein, in the case that a new device is connected under a situation in which multiple devices have been connected to the USB hub and that it is judged that the power to be supplied to the newly connected device is insufficient, the power to be supplied to the newly connected device is obtained securely by changing the operation modes of the multiple devices. Furthermore, it may also be possible to have a configuration wherein, after the use of the newly connected device is completed, the operation modes of the multiple devices, having been changed, are returned to their original modes.

Embodiment 3

Embodiment 1 is configured so that, in the case that the device side judges that the device is inoperable in the operation mode designated by the image forming apparatus 100 owing to insufficient power supply, the user is urged to supply power to the USB hub. However, in the case that another device is connected to the USB hub, it may be possible to have a configuration in which the power supply to the other device is shut off to securely obtain power to be supplied to the newly connected device. The configuration of the hardware is the same as that of Embodiment 1.

Figure 11:
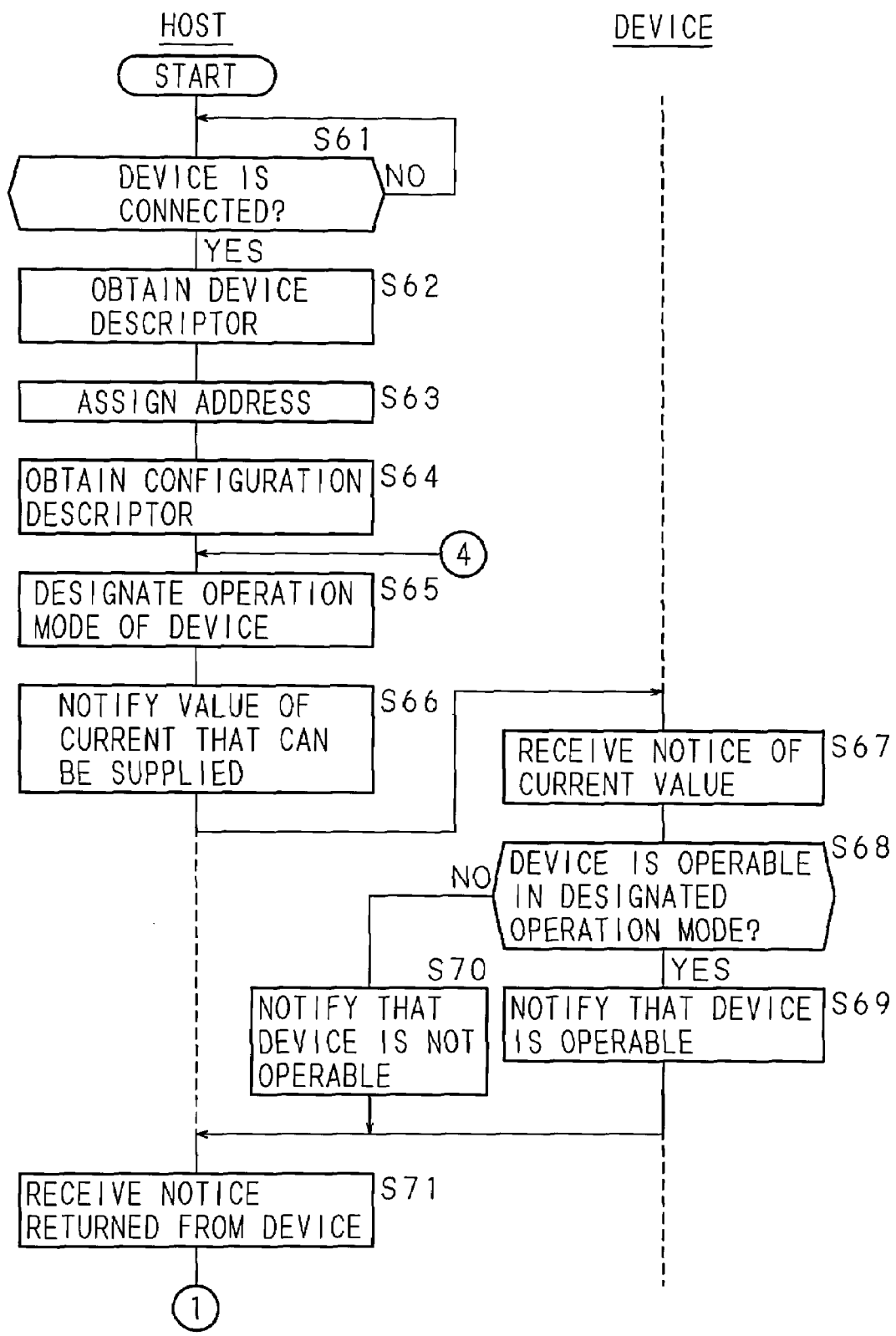
FIG. 11 is a flowchart illustrating an operation procedure in the case that a USB device is newly connected.
Figure 12:
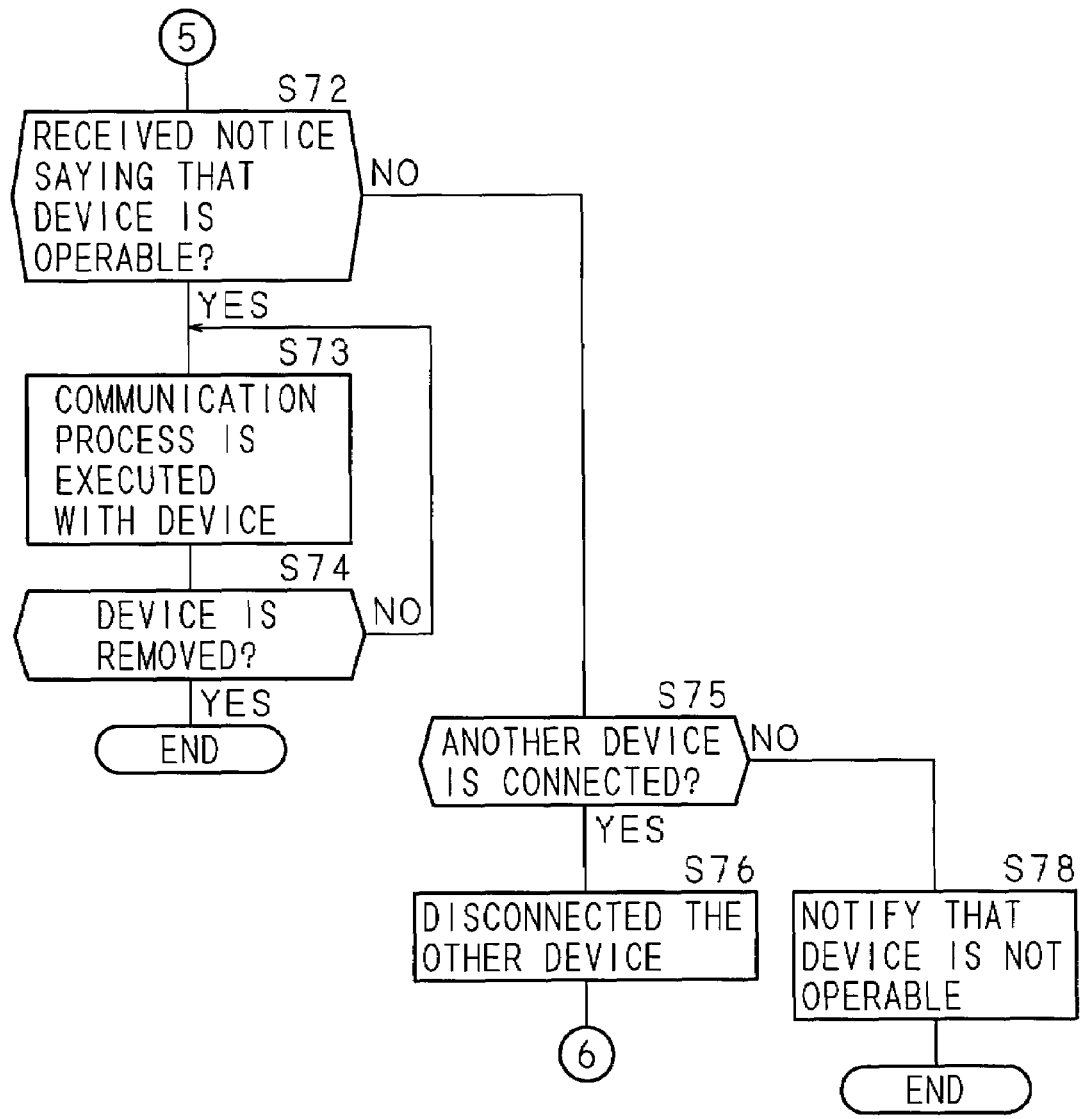
FIG. 12 is a flowchart illustrating an operation procedure in the case that a USB device is newly connected.

FIG. 11 and FIG. 12 are flowcharts illustrating an operation procedure in the case that a USB device is newly connected. The processing steps from the detection of a newly connected device to the reception of a notice regarding whether the device is operable are carried out in the same way as in Embodiment 1 (step S61 to step S71). In the case that the image forming apparatus 100 has received the notice returned from the device (at step S71), the CPU 101 judge whether the received notice is a notice saying that the device is operable (at step S72).

In the case that it is judged that the received notice is a notice saying that the device is operable (YES at step S72), the magnitude of the current required for the device is supplied, and communication processing with the device is carried out (at step S73). Next, the host controller 107a detects the change in the potential of the D+ terminal (or the D− terminal) of the port 107b, thereby judging whether the device is removed (at step S74). In the case that it is judged that the device is removed (YES at step S74), the processing in this flowchart is completed. In the case that it is judged that the device is not removed (NO at step S74), the CPU 101 returns the processing to step S73.

Furthermore, in the case that it is judged at step S72 that the notice returned from the newly connected device is a notice saying that the device is inoperable (NO at step S72), the CPU 101 refers to the registrations in the device management table 106a, and judges whether another device is connected (at step S75). In the case that the CPU 101 judges that the other device is not connected (NO at step S75), because the magnitude of the current to be supplied to the newly connected device cannot be increased, the CPU 101 displays character information on the display section 103b of the operation panel 103 to notify information saying that the newly connected device is inoperable (at step S78).

In the case that it is judged that the other device is connected (YES at step S75), the CPU 101 instructs the host controller 107a to cut off the pull-up at the D+ terminal, thereby disconnecting the other device (at step S76). In the case that the other device is disconnected, the power supply thereto is stopped, and the power to the newly connected device can be obtained securely.

After the other device is disconnected, the CPU 101 returns the processing to step S65. At this time, the CPU 101 controls the host controller 107a of the USB interface 107 to designate the operation mode of the newly connected device again. Herein, the CPU 101 designates the same operation mode as the operation mode designated at the last time. When the value of the current that can be supplied is notified at step S66, because the other device is disconnected so that the power supply thereto is stopped, a current value larger than that at the last time can be notified. In the case that the newly connected device is operable on the basis of the current value notified, the image forming apparatus 100 can communicate with the device. At the time when the device is removed from the USB hub, the processing in this flowchart is completed. Moreover, in the case that the device is inoperable, a notice saying that the device is inoperable is issued eventually at step S78, and the processing in this flowchart is completed.

In this embodiment, when a new device is connected and in the case that it is judged that the device cannot operate owing to insufficient power supply, another device is disconnected so that the power supply thereto is stopped, whereby the power to be supplied to the newly connected device is obtained securely as described above. In other words, the power supply to the device that is going to be used by the user is carried out preferentially. Therefore, it is possible to reduce situations in which the newly connected device cannot be used owing to insufficient supply current.

It may be possible to have a configuration wherein, in the case that a new device is connected under a situation in which multiple devices have been connected to the USB hub and that it is judged that the power to be supplied to the newly connected device is insufficient, the power to be supplied to the newly connected device is obtained securely by disconnecting the multiple devices. Furthermore, it may also be possible to have a configuration wherein, after the use of the newly connected device is completed, the disconnected devices are reconnected by the reconnection of the pull-up at the D+ terminal.

Embodiment 4

The above-mentioned embodiments are configured so that, in the case that a new device is connected to the image forming apparatus 100 serving as a USB host, the operation mode of the device is designated by the image forming apparatus 100, so that the magnitude of the current that can be supplied to the device is notified, and so that the judgment as to whether the device is operable in the designated operation mode is made on the side of the device. However, because the image forming apparatus 100 carries out the management of supply current and can obtain the information on the operation mode and the information on the current consumption in each operation mode by obtaining descriptors from the device, the judgment as to whether the device is operable in the designated operation mode can be made on the side of the image forming apparatus 100.

In this embodiment, a configuration is described in which, in the case that a new device is connected, the judgment as to whether the device is operable is made on the side of the image forming apparatus 100.

Figure 13:
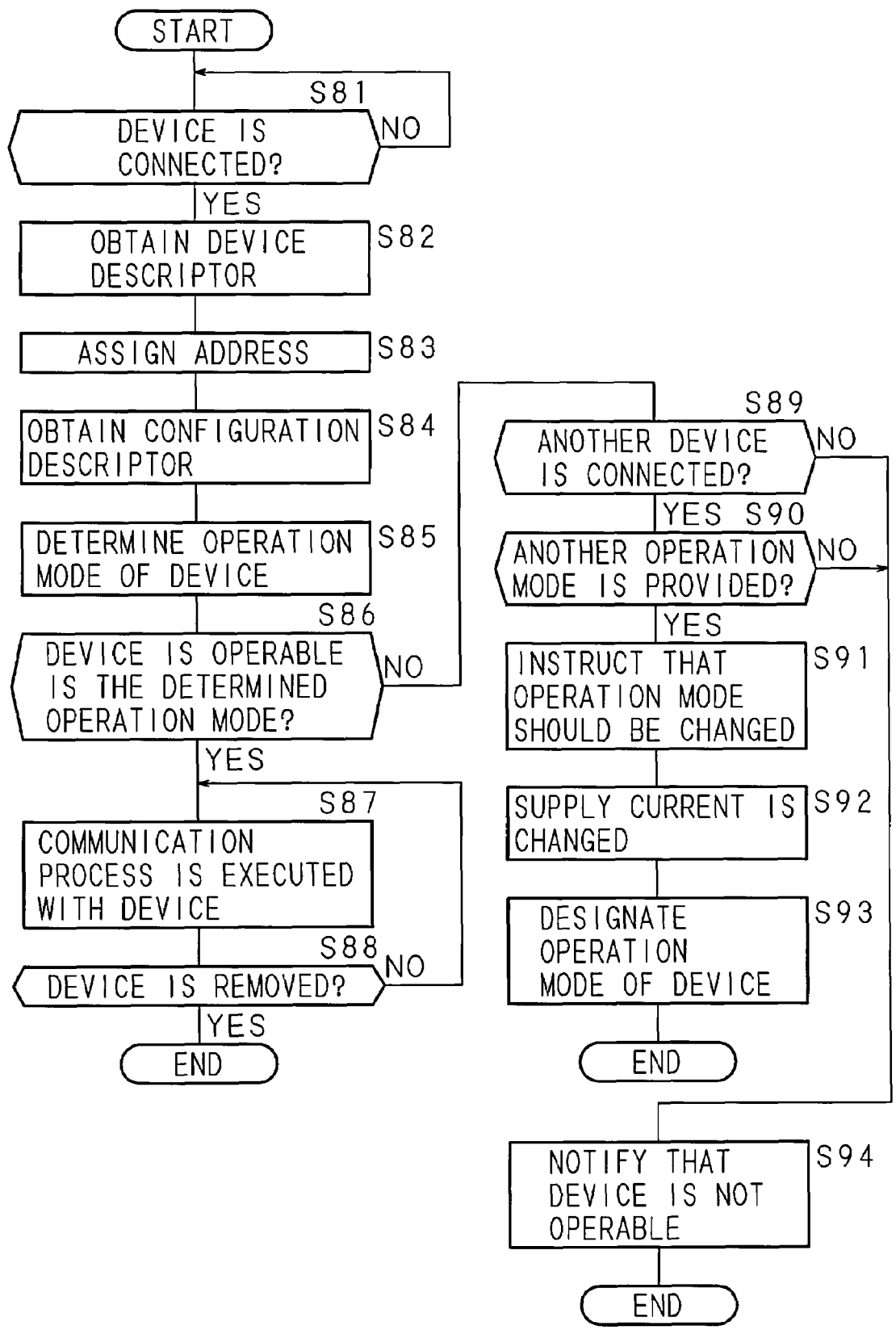
FIG. 13 is a flowchart illustrating an operation procedure in the case that a USB device is newly connected.

FIG. 13 is a flowchart illustrating an operation procedure in the case that a USB device is newly connected. The host controller 107a inside the USB interface 107 installed in the image forming apparatus 100 first judges whether a new device is connected to the port 107b (at step S81). In the case that the host controller judges that no device is connected (NO at step S81), the host controller stands by until a new device is connected.

After the connection of the device is detected (YES at step S81), the host controller 107a executes configuration. For this purpose, the host controller 107a first outputs "Get_Descriptor(Device)" command, and requests the transfer of the device descriptors held inside the device, and obtains the device descriptors transferred from the device (at step S82). Furthermore, the host controller 107a transfers "Set_Address" command to the connected device to assign an address thereto (at step S83). Next, the host controller 107a outputs "Get_Descriptor(Configuration)" command, and requests the transfer of the configuration descriptors held inside the device, and obtains the configuration descriptors transferred from the device in response to the request (at step S84). The information obtained through the descriptors is notified to the CPU 101. Upon receipt of the notice, the CPU 101 renews the registrations in the device management table 106a on the basis of the information.

After the completion of the configuration in the USB interface 107, the CPU 101 refers to the registrations in the device management table 106a, and determines the recommended operation mode of the device (at step S85). Because it is not necessary to notify the operation mode to the device side at this time, it is not necessary to output "Set_Configuration (Configuration #N)" command.

Next, the CPU 101 judges whether the device is operable in the determined operation mode (at step S86). By referring to the supply current management table 106b, the CPU 101 can grasp the magnitude of the current that can be supplied at the present time, and can obtain the information on the current consumption in each operation mode from the information included in the configuration descriptors. Therefore, by comparing them, the CPU 101 can judge whether the device is operable. In the case that the CPU 101 judges that the device is operable in the determined operation mode (YES at step S86), the magnitude of the current required for the device is supplied, and communication processing with the device is carried out (at step S87). Next, the host controller 107a detects the change in the potential of the D+ terminal (or the D− terminal) of the port 107b, thereby judging whether the device is removed (at step S88). In the case that it is judged that the device is not removed (NO at step S88), the CPU 101 returns the processing to step S87.

Furthermore, in the case that it is judged at step S86 that the device is inoperable in the determined operation mode (NO at step S86), the CPU 101 refers to the registrations in the device management table 106a, and judges whether another device is connected to the USB hub (at step S89). In the case that the CPU 101 judges that the other device is not connected (NO at step S89), because the magnitude of the current to be supplied to the newly connected device cannot be increased, the CPU 101 displays character information on the display section 103b of the operation panel 103 to notify information saying that the newly connected device is inoperable (at step S94).

In the case that the CPU 101 judges that the other device is connected (YES at step S89), the CPU 101 refers to the registrations in the device management table 106a, and judges whether the other device has another operation mode (at step S90). In the case that the CPU 101 judges that the other device does not have the other operation mode (NO at step S90), because the magnitude of the current to be supplied to the newly connected device cannot be increased, the CPU 101 displays character information on the display section 103b of the operation panel 103 to notify that the newly connected device is inoperable (at step S94).

In the case that the CPU 101 judges at step S90 that the other device has the other operation mode (YES at step S90), the CPU 101 instructs that the operation mode should be changed (at step S91). When the operation mode of the newly connected device is determined at step S85, the operation mode requiring higher current consumption is selected so that the device can operate in a proper state. Hence, the magnitude of the current to be supplied to the other device can be reduced by changing the operation mode thereof, and the power to the newly connected device can be obtained securely.

After the change of the operation mode is instructed, the magnitude of the current to be supplied to the other device, the operation mode of which is changed, is changed (at step S92), and the operation mode of the newly connected device is designated (at step S93). In other words, to designate the operation mode determined at step S85, the CPU 101 controls the host controller 107a of the USB interface 107 so that the host controller outputs "Set_Configuration(Configuration #N)" command. Then, the magnitude of the current required for the newly connected device, the operation mode of which is designated, is supplied, and the newly connected device is operated.

In this embodiment, when a new device is connected and in the case that it is judged that the device cannot operate owing to insufficient power supply, the magnitude of the current to be supplied to another device is reduced, whereby the power to be supplied to the newly connected device is obtained securely as described above. In other words, the power supply to the device that is going to be used by the user is carried out preferentially. Therefore, it is possible to reduce situations in which the newly connected device cannot be used owing to insufficient supply current. Furthermore, in this embodiment, the judgment as to whether the newly connected device is operable can be made on the side of the image forming apparatus 100 by obtaining descriptors from the device. It is thus not necessary to provide a judging means on the device side. Therefore, this embodiment is applicable to systems including a conventional device having no judging means.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A control system comprising:
   an electronic device;
   a hub; and
   one or more external devices that are capable of sequentially connecting to said electronic device, wherein
   said electronic device comprises:
      a port;
      a supplying section for supplying currents to said hub connected to said port and supplying currents to an external device among said one or more external devices connected via said hub;
      a storage section for storing the magnitude of the total current supplied from said supplying section; and
      a controller capable of performing operations of:
         calculating the magnitude of a current that can be supplied to an external device connected via said hub among said one or more external devices based on the magnitude of the total current stored in said storage section; and
         notifying the calculated magnitude of the current to said external device connected via said hub; and
   each external device among said one or more external device comprises:

a judging section for judging whether said external device is operable based on the magnitude of the current notified from said electronic device; and a notifying section for notifying the judgment result made by said judging section to said electronic device, wherein said controller is further capable of performing operations of judging, in the case that a judgment result notified from a newly connected external device among said one or more external devices is that said newly connected external device is inoperable, whether another external device among said one or more external devices excluding said newly connected external device is already connected via said hub, and in the case that it is judged that said another external device is already connected, reducing current supply to said another external device among said one or more external devices excluding said newly connected external device by changing operation mode of said another external device, and supplying currents preferentially to said newly connected external device based on said newly connected external device being newly connected via said hub.

2. The control system according to claim 1, wherein said hub is operable by a current supplied from an external power supply, and said controller is further capable of performing an operation of providing information saying that a current should be supplied to said hub from said external power supply when the judgment result notified from said newly connected external device is that said newly connected external device is inoperable.

3. The control system according to claim 1, wherein said external device further comprises:

a storage section for storing image data, and said controller is further capable of performing operations of capturing the image data stored in said external device when information saying that said external device is operable is received from said external device connected via said hub; and forming images on a sheet based on the captured image data.

4. An electronic device comprising:

a port;

a supplying section for supplying currents to a hub connected to said port and supplying currents to an external device among one or more external devices connected via said hub;

a storage section for storing the magnitude of the total current supplied from said supplying section; and a controller capable of performing operations of:

calculating the magnitude of a current that can be supplied to an external device connected via said hub among said one or more external devices based on the magnitude of the total current stored in said storage section; and notifying the calculated magnitude of the current to said external device connected via said hub;

obtaining information about operability or inoperability judged by said connected external device connected via said hub when the magnitude of the current that can be supplied is notified;

judging, in the case that a judgment result notified from a newly connected external device among said one or more external devices is that said newly connected external device is inoperable, whether another external device among said one or more external devices excluding said newly connected external device is already connected via said hub; and in the case that it is judged that said another external device is already connected, reducing current supply to said another external device among said one or more external devices excluding said newly connected external device by changing operation mode of said another external device, and supplying currents preferentially to said newly connected external device based on said newly connected external device being newly connected via said hub.

5. The electronic device according to claim 4, wherein said hub can be operated by a current supplied from an external power supply, and said controller is further capable of notifying information saying that a current should be supplied to said hub from said external power supply when the obtained information says that said newly connected external device is inoperable at the time that the magnitude of the current that can be supplied is notified.

6. The electronic device according to claim 4, wherein said external device connected via said hub further comprises a storage section for storing image data connected, and said controller is further capable of performing operations of capturing the image data stored in said external device when information saying that said external device is operable is received from said external device connected via said hub; and forming images on a sheet based on the captured image data.

7. An electronic device comprising:

a port;

supplying means for supplying currents to a hub connected to said port and supplying currents to an external device among one or more external devices connected via said hub;

a storage means for storing the magnitude of the total current supplied from said supplying section; and means for calculating the magnitude of a current that can be supplied to an external device connected via said hub among said one or more external devices based on the magnitude of the total current stored in said storage section; and means for notifying the calculated magnitude of the current to said external device connected via said hub;

means for obtaining information about operability or inoperability judged by said external device connected via said hub when the magnitude of the current that can be supplied is notified;

means for judging, in the case that a judgment result notified from a newly connected external device among said one or more external devices is that said newly connected external device is inoperable, whether another external device among said one or more external devices excluding said newly connected external device is already connected via said hub; and means for reducing current supply to another external device among said one or more external devices excluding said newly connected external device by changing operation mode of said another external device in the case that it is judged that said another external device is connected, and supplying currents preferentially to said newly connected external device based on said newly connected external device being newly connected via said hub.

8. The electronic device according to claim 7, wherein said hub can be operated by a current supplied from the external power supply; and
   further comprises:
   means for notifying information saying that a current should be supplied to said hub from said external power supply when the obtained information says that said newly connected external device is inoperable at the time that the magnitude of the current that can be supplied is notified.

9. The electronic device according to claim 7, wherein
   said external device connected via said hub further comprises means for storing image data, and
   further comprises:
   means for capturing the image data stored in said external device when information saying that said external device is operable is received from said external device connected via said hub; and
   means for forming images on a sheet based on the captured image data.

10. An electronic device comprising:
    a port;
    supplying means for supplying currents to a hub connected to said port and supplying currents to an external device among one or more external devices connected via said hub;
    storage means for storing the magnitude of the total current supplied from said supplying section; and
    means for calculating the magnitude of a current that can be supplied to an external device connected via said hub among said one or more external devices based on the magnitude of the total current stored in said storage section; and
    means for notifying the calculated magnitude of the current to said external device connected via said hub;
    means for obtaining information about operability or inoperability judged by said external device connected via said hub when the magnitude of the current that can be supplied is notified;
    means for judging, in the case that a judgment result notified from a newly connected external device among said one or more external devices is that said newly connected external device is inoperable, whether another external device among said one or more external devices excluding said newly connected external device is already connected via said hub; and
    means for stopping current supply to another external device among said one or more external devices excluding said newly connected external device by disconnecting said another external device in the case that it is judged that said another external device is already connected, and supplying currents preferentially to said newly connected external device based on said newly connected external device being newly connected via said hub.

11. An image forming apparatus comprising:
    a port;
    an image forming section for forming images on a sheet by capturing image data from one or more external devices connected to said port via a hub;
    a supplying section for supplying currents to said hub connected to said port and supplying currents to an external device among said one or more external devices connected via said hub; and
    a storage section for storing the magnitude of the total current supplied from said supplying section; and
    controller capable of performing operations of:
        calculating the magnitude of a current that can be supplied to an external device connected via said hub among said one or more external devices based on the magnitude of the total current stored in said storage section; and
        notifying the calculated magnitude of the current to said external device connected via said hub;
        obtaining information about operability or inoperability judged by said external device connected via said hub when the magnitude of the current that can be supplied is notified;
        judging, in the case that a judgment result notified from a newly connected external device among said one or more external devices is that said newly connected external device is inoperable, whether another external device among said one or more external devices excluding said newly connected external device is already connected via said hub; and
        in the case that it is judged that said another external device is already connected, reducing current supply to said another external device among said one or more external devices excluding said newly connected external device by changing operation mode of said another external device, and supplying currents preferentially to said newly connected external device based on said newly connected external device being newly connected via said hub.

12. A control system comprising:
    an electronic device;
    a hub; and
    one or more external devices that are capable of sequentially connecting to said electronic device, wherein
    said electronic device comprises:
        a port;
        a supplying section for supplying currents to said hub connected to said port and supplying currents to an external device among said one or more external devices connected via said hub;
        a storage section for storing the magnitude of the total current supplied from said supplying section; and
        a controller capable of performing operations of:
            calculating the magnitude of a current that can be supplied to an external device connected via said hub among said one or more external devices based on the magnitude of the total current stored in said storage section; and
            notifying the calculated magnitude of the current to said external device connected via said hub; and
    each external device among said one or more external device comprises;
        a judging section for judging whether said external device is operable based on the magnitude of the current notified from said electronic device; and
        a notifying section for notifying the judgment result made by said judging section to said electronic device, wherein
    said controller is further capable of performing operations of judging, in the case that a judgment result notified from a newly connected external device among said one or more external devices is that said newly connected external device is inoperable, whether another external device among said one or more external devices excluding said newly connected external device is already connected via said hub, and in the case that it is judged that said another external device is already connected, stopping current supply to said another external device among said one or more external devices excluding said newly connected external device by disconnecting said another external device, and supplying currents preferentially to said newly connected external device based on said newly connected external device being newly connected via said hub.

13. A control system comprising:
an electronic device;
a hub; and
one or more external devices that are capable of sequentially connecting to said electronic device, wherein
said electronic device comprises:
   a port;
   supplying means for supplying currents to said hub connected to said port and supplying currents to an external device among said one or more external devices connected via said hub;
   storage means for storing the magnitude of the total current supplied from said supplying section; and
   means for calculating the magnitude of a current that can be supplied to an external device connected via said hub among said one or more external devices based on the magnitude of the total current stored in said storage section; and
   means for notifying the calculated magnitude of the current to said external device connected via said hub,
each external device among said one or more external device comprises:
   means for judging whether said external device is operable based on the magnitude of the current notified from said electronic device; and
   means for notifying the judgment result to said electronic device, wherein
said electronic device judges, in the case that a judgment result notified from a newly connected external device among said one or more external devices is that said newly connected external device is inoperable, whether another external device among said one or more external devices excluding said newly connected external device is already connected via said hub, and, in the case that it is judged that said another external device is already connected, reduces current supply to said another external device among said one or more external devices excluding said newly connected external device by changing operation mode of said another external device, and supplying currents preferentially to said newly connected external device based on said newly connected external device being newly connected via said hub.

14. The control system according to claim 13, wherein
said hub is operable by a current supplied from an external power supply, and
said the electronic device further comprises:
   means for providing information saying that a current should be supplied to said hub from said external power supply when the judgment result notified from said newly connected external device is that said newly connected external device is inoperable.

15. The control system according to claim 13, wherein
said external device further comprises:
   means for storing image data, and
said electronic device further comprises:
   means for capturing the image data stored in said external device when information saying that said external device is operable is received from said external device connected via said hub; and
   means for forming images on a sheet based on the captured image data.

16. A control system comprising:
an electronic device;
a hub; and
one or more external devices that are capable of sequentially connecting to said electronic device, wherein
said electronic device comprises:
   a port;
   supplying means for supplying currents to said hub connected to said port and supplying currents to an external device among said one or more external devices connected via said hub;
   storage means for storing the magnitude of the total current supplied from said supplying section; and
   means for calculating the magnitude of a current that can be supplied to an external device connected via said hub among said one or more external devices based on the magnitude of the total current stored in said storage section; and
   means for notifying the calculated magnitude of the current to said external device connected via said hub,
each external device among said one or more external device comprises:
   means for judging whether said external device is operable based on the magnitude of the current notified from said electronic device; and
   means for notifying the judgment result to said electronic device, wherein
said electronic device judges, in the case that a judgment result notified from a newly connected external device among said one or more external devices is that said newly connected external device is inoperable, whether an external device among said one or more external devices excluding said newly connected external device is already connected via said hub, and, in the case that it is judged that said another external device is already connected, stops current supply to said another external device among said one or more external devices excluding said newly connected external device by disconnecting said another external device, and supplying currents preferentially to said newly connected external device based on said newly connected external device being newly connected via said hub.

17. An electronic device comprising:
a port;
a supplying section for supplying currents to a hub connected to said port and supplying currents to an external device among one or more external devices connected via said hub;
a storage section for storing the magnitude of the total current supplied from said supplying section; and
a controller capable of performing operations of:
   calculating the magnitude of a current that can be supplied to an external device connected via said hub among said one or more external devices based on the magnitude of the total current stored in said storage section; and
   notifying the calculated magnitude of the current to said external device connected via said hub;
   obtaining information about operability or inoperability judged by said external device connected via said hub when the magnitude of the current that can be supplied is notified;
   judging, in the case that a judgment result notified from a newly connected external device among said one or more external devices is that said newly connected external device is inoperable, whether another external device among said one or more external devices excluding said newly connected external device is already connected via said hub; and in the case that it is judged that said another external device is already connected, stopping current supply to said another external device among said one or more external devices excluding said newly connected external device by disconnecting said another external device, and supplying currents preferentially to said newly connected external device based on said newly connected external device being newly connected via said hub.

* * * * *